United States Patent
Tu et al.

(10) Patent No.: US 6,914,740 B1
(45) Date of Patent: Jul. 5, 2005

(54) DISK DRIVE EMPLOYING BEMF SPINDLE SPEED CONTROL OR WEDGE SPINDLE SPEED CONTROL

(75) Inventors: Kuang-Yang Tu, Irvine, CA (US); Chuanwen Ji, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 34 days.

(21) Appl. No.: 10/724,386

(22) Filed: Nov. 26, 2003

(51) Int. Cl.[7] .............................................. G11B 15/46
(52) U.S. Cl. ................. 360/73.03; 360/73.01
(58) Field of Search .................. 360/69, 71, 73.01, 360/73.03; 310/67 R, 68 R; 318/495, 268–272; 388/928.1

(56) References Cited

U.S. PATENT DOCUMENTS

| | | | |
|---|---|---|---|
| 5,038,232 A | * | 8/1991 | Grace .................... 360/73.03 |
| 5,218,491 A | * | 6/1993 | Nishida et al. .......... 360/73.03 |
| 6,067,202 A | | 5/2000 | Rowan et al. |
| 6,754,025 B1 | | 6/2004 | Shepherd et al. |
| 2004/0245950 A1 | * | 12/2004 | Ang et al. .................. 318/268 |

* cited by examiner

*Primary Examiner*—David Hudspeth
*Assistant Examiner*—Jason Olson
(74) *Attorney, Agent, or Firm*—Milad G. Shara, Esq.; Howard H. Sheerin, Esq.

(57) ABSTRACT

A disk drive is disclosed employing either back electromotive force (BEMF) spindle speed control or wedge spindle speed control. The BEMF spindle speed control is used to calibrate a reference time period representing an accumulation of a predetermined number of wedge-to-wedge times. During wedge spindle speed control, a wedge time period representing an accumulation of a predetermined number of wedge-to-wedge times is measured, and a wedge speed error is computed as the difference between the reference time period and the wedge time period.

30 Claims, 5 Drawing Sheets

DISK DRIVE EMPLOYING BEMF SPINDLE SPEED CONTROL OR WEDGE SPINDLE SPEED CONTROL

BACKGROUND OF THE INVENTION

1. Field of the Invention

The present invention relates to disk drives. In particular, the present invention relates to a disk drive employing back electromotive force (BEMF) spindle speed control or wedge spindle speed control.

2. Description of the Prior Art

A disk drive typically comprises one or more disks rotated by a spindle motor while heads are actuated radially over the disk surfaces. Each disk surface comprises a number of radially spaced, concentric tracks, where each track is divided into a number of data sectors. A number of embedded servo wedges are also written on each disk surface which facilitate seeking the head and maintaining the head over the centerline of a target track during read and write operations. The disks are rotated at a constant angular velocity (CAV) while varying the data rate from an inner diameter zone to an outer diameter zone to maximize the recording density.

In order to achieve accurate reproduction, it is important to maintain the spindle motor "at speed" while writing data to and reading the data form the disks. To this end, prior art disk drives typically control the spindle speed by monitoring zero crossings in the BEMF voltage generated by the un-energized winding within the spindle motor. However, the bandwidth of a spindle speed control loop using BEMF voltage as feedback may be insufficient for a desired recording density or vibration tolerance.

U.S. Pat. No. 6,067,202 suggests to measure the time between servo sector pulses coincident with detecting each servo wedge, and to generate a speed error by comparing the measured time to a reference time corresponding to the desired spindle speed. Since the servo sector pulses occur more frequently than zero crossings in the BEMF voltage, the bandwidth of the spindle speed control loop increases, allowing for higher recording densities and/or improved vibration tolerance. However, the '202 patent discloses very little implementation details for a spindle speed control loop using servo sector pulses as feedback, and in particular, no implementation details on generating a reliable speed error measurement or recovering from error conditions.

There is, therefore, a need for a disk drive employing a reliable, fail-safe spindle speed control loop using servo wedges as feedback for generating a speed error.

SUMMARY OF THE INVENTION

The present invention may be regarded as a disk drive comprising a disk having a plurality of tracks, wherein each track comprises a plurality of data sectors and a plurality of servo wedges. A head is actuated over the disk, and a spindle motor rotates the disk at an operating speed in response to a spindle control current, the spindle motor comprising a plurality of windings which generate a back electromotive force (BEMF) voltage. A BEMF detector generates a BEMF signal by comparing the BEMF voltage to a threshold. A BEMF speed error is measured in response to the BEMF signal during a BEMF spindle speed control mode. The spindle control current is updated in response to the BEMF speed error to drive the disk at the operating speed. A wedge-to-wedge time representing a time period between each servo wedge is measured, and a reference time period is calibrated representing an accumulation of a predetermined number of wedge-to-wedge times while the BEMF speed error is substantially zero. The disk drive then switches to a wedge spindle speed control mode wherein a wedge time period is measured representing an accumulation of a predetermined number of wedge-to-wedge times. A wedge speed error is generated representing a difference between the reference time period and the wedge time period. The disk is maintained at the operating speed by updating the spindle control current in response to the wedge speed error.

In one embodiment, an at-speed current is calibrated corresponding to a substantially zero wedge speed error. A time-out error condition is detected if the spindle control current is not updated within a time-out interval, and the at-speed current is applied to the spindle motor until the spindle control current is updated.

In one embodiment, a default at-speed current is calibrated corresponding to a substantially zero BEMF speed error.

In another embodiment, a wedge time counter is incremented at a predetermined frequency. A predetermined number of wedge time counter values are accumulated representing a predetermined number of wedge-to-wedge times to generate the wedge time period.

In another embodiment, the wedge time counter value is not included in the wedge time period if a servo wedge error is detected. In one embodiment, the servo wedge error includes an inability to synchronize to a servo wedge. In another embodiment, the servo wedge error includes detecting an invalid track identification value in a servo wedge. In yet another embodiment, the servo wedge error includes detecting an invalid wedge time counter value. In one embodiment, the time-out error condition occurs if the disk controller excludes a predetermined number of wedge time counter values from the wedge time period.

In yet another embodiment, the time-out error condition subsides after successfully accumulating a predetermined number of wedge time counter values and updating the spindle control current.

In still another embodiment, if the time-out error condition does not subside within a predetermined failure interval, the spindle motor is controlled in response to the BEMF speed error generated from the BEMF signal. In one embodiment, the failure interval equals one revolution of the disk. In one embodiment, if the disk controller successfully accumulates a predetermined number of wedge time counter values and updates the spindle control current, the disk controller begins controlling the spindle motor in response to the wedge speed error.

In still another embodiment, the disk drive further comprises a current modulator for generating a PWM signal representing the spindle control current. BEMF detection window circuitry periodically disables the PWM signal for a predetermined interval to attenuate noise in the BEMF voltage while the BEMF detector compares the BEMF voltage to the threshold. The disk controller disables the BEMF detection window circuitry while updating the spindle control current in response to the wedge speed error.

In yet another embodiment, the disk controller switches from the wedge spindle speed control mode to the BEMF spindle speed control mode. During a settle interval between modes, an at-speed current is applied to the spindle motor.

The present invention may also be regarded as a method of operating a disk drive, the disk drive comprising a disk having a plurality of tracks, wherein each track comprises a plurality of data sectors and a plurality of servo wedges. A head is actuated over the disk, and a spindle motor rotates the disk at an operating speed in response to a spindle control current. The spindle motor comprises a plurality of windings which generate a back electromotive force (BEMF) voltage, and a BEMF detector generates a BEMF signal by comparing the BEMF voltage to a threshold. A BEMF speed error is measured responsive to the BEMF signal during a BEMF spindle speed control mode, and the spindle control current is updated in response to the BEMF speed error to drive the disk at the operating speed. A wedge-to-wedge time representing a time period between each servo wedge is measured, and a reference time period is calibrated representing an accumulation of a predetermined number of wedge-to-wedge times while the BEMF speed error is substantially zero. After switching to a wedge spindle speed control mode, a wedge time period is measured representing an accumulation of a predetermined number of wedge-to-wedge times, and a wedge speed error is generated representing a difference between the reference time period and the wedge time period. The disk is maintained at the operating speed by updating the spindle control current in response to the wedge speed error.

DESCRIPTION OF THE PREFERRED EMBODIMENTS

Figure 1A:
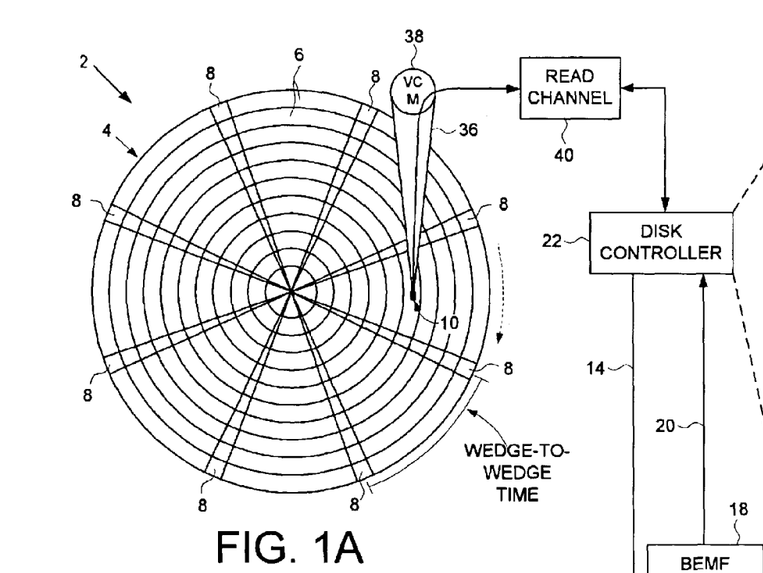
FIGS. 1A and 1B show a disk drive according to an embodiment of the present invention comprising a disk having a plurality of servo wedges, a head actuated over the disk, a spindle motor for rotating the disk, and a disk controller.
Figure 1B:
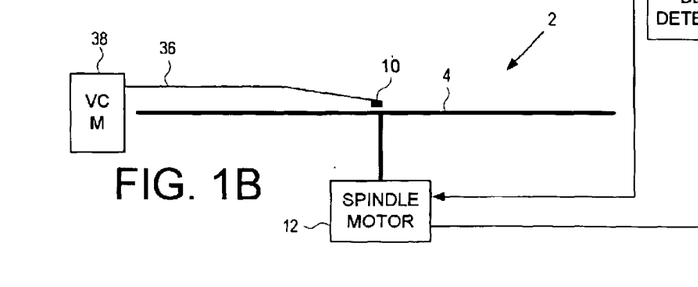
Figure 2:
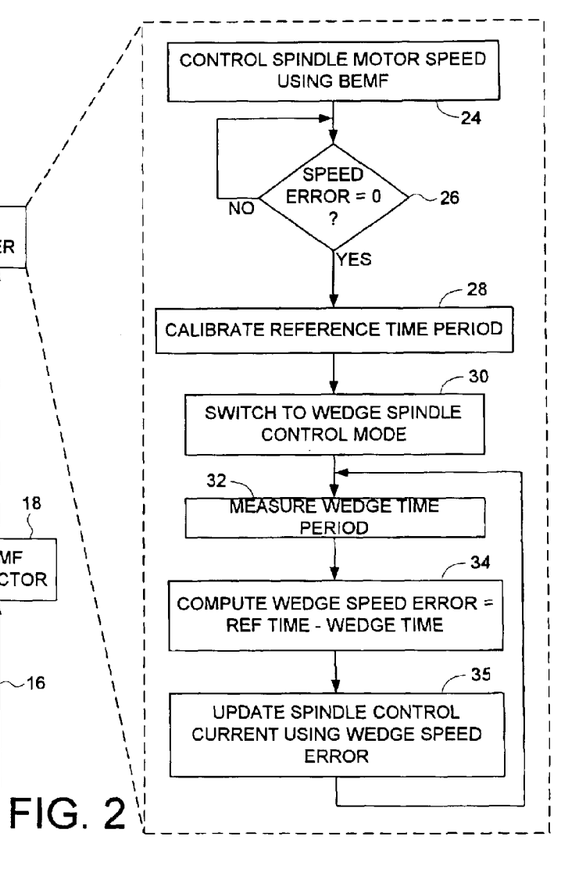
FIG. 2 is a flow diagram executed by the disk controller according to an embodiment of the present invention wherein a reference time period is calibrated using the BEMF spindle speed control mode, the reference time period for use in generating a wedge speed error while in the wedge spindle speed control mode.

FIGS. 1A and 1B show a disk drive 2 according to an embodiment of the present invention comprising a disk 4 having a plurality of tracks 6, wherein each track 6 comprises a plurality of data sectors and a plurality of servo wedges 8. A head 10 is actuated over the disk 4, and a spindle motor 12 rotates the disk 4 at an operating speed in response to a spindle control current 14, the spindle motor 12 comprising a plurality of windings which generate a back electromotive force (BEMF) voltage 16. A BEMF detector 18 generates a BEMF signal 20 by comparing the BEMF voltage 16 to a threshold. A disk controller 22 executes the steps of the flow diagram shown in FIG. 2 to control the spindle motor 12 by generating the spindle control current 14 during a BEMF spindle speed control mode or a wedge spindle speed control mode. At step 24, a BEMF speed error is generated in response to the BEMF signal 20 during the BEMF spindle speed control mode, and the spindle control current 14 is updated in response to the BEMP speed error to drive the disk 4 at the operating speed. If at step 26 the BEMF speed error is substantially zero, at step 28 a reference time period is calibrated by accumulating a predetermined number of wedge-to-wedge times, wherein the wedge-to-wedge time represents a time period between each servo wedge (FIG. 1A). At step 30, the disk controller 22 switches to the wedge spindle speed control mode. At step 32 a wedge time period is measured by accumulating a predetermined number of wedge-to-wedge times, and at step 34 a wedge speed error is generated representing a difference between the reference time period and the wedge time period. At step 35 the disk 4 is maintained at the operating speed by updating the spindle control current 14 in response to the wedge speed error.

In the embodiment of FIGS. 1A and 1B, the head 10 is connected to a distal end of an actuator arm 36 which is rotated about a pivot by a voice coil motor (VCM) 38 in order to actuate the head 10 radially over the disk 4. A read channel 40 processes the read signal emanating from the head 10 and generates an estimated binary sequence representing the data recorded on the disk 4. The read channel 40 also detects the occurrence of the servo wedges 8 used to update a wedge time counter. The read channel 40 may be implemented as a separate integrated circuit, or integrated with the disk controller 22 in a "system on a chip". Similarly, the BEMF detector 18 may be integrated into the disk controller 22 or implemented in a separate servo controller chip.

Figure 3:
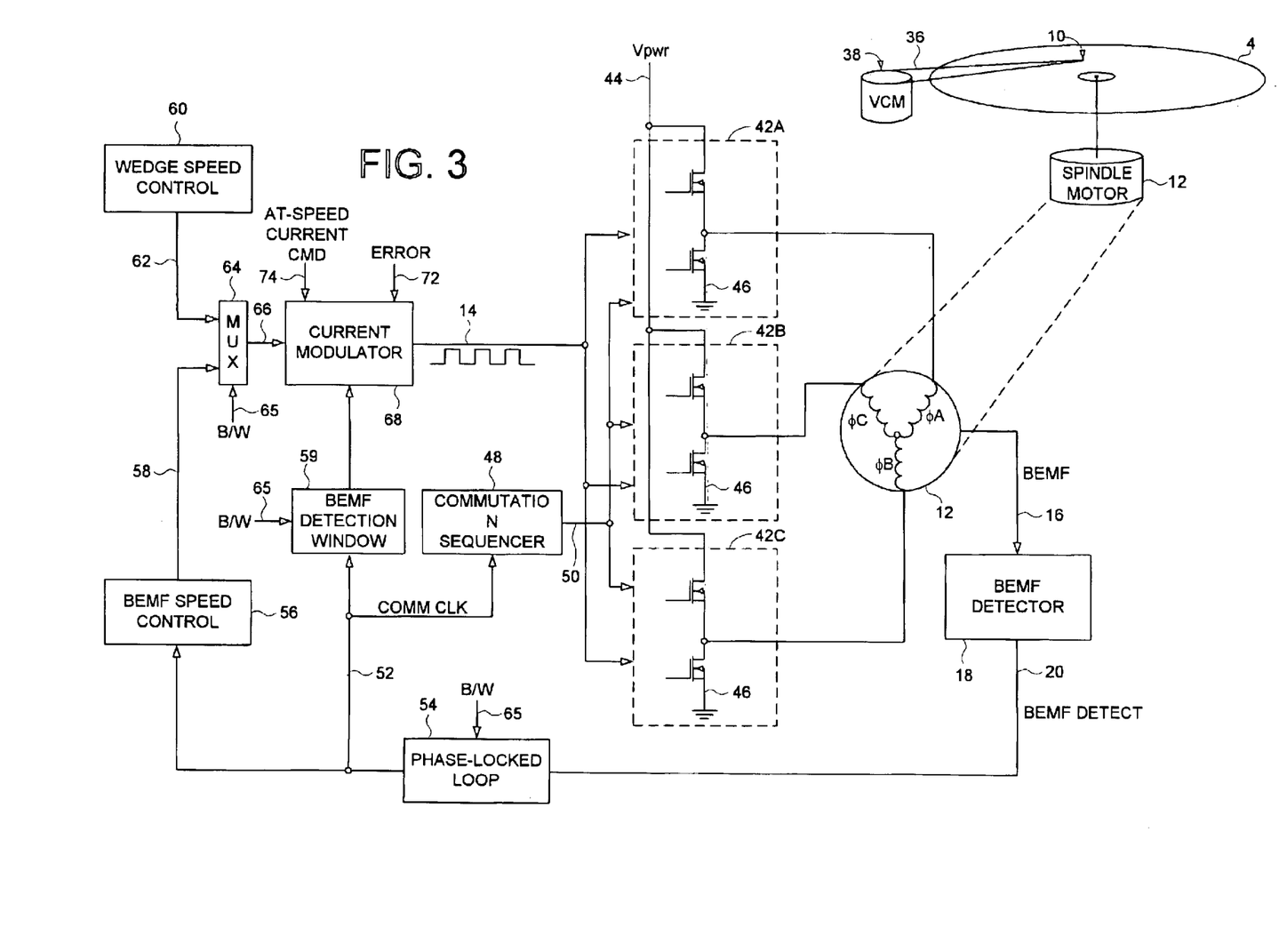
FIG. 3 shows further details of the spindle control circuitry according to an embodiment of the present invention including a BEMF detector, a phased-locked-loop, BEMF detection window circuitry, a commutation sequencer, and a current modulator for generating a PWM current control signal.

FIG. 3 shows a spindle motor 12 according to an embodiment of the present invention comprising three windings connected at a center tap forming three phases ($\phi A$, $\phi B$, $\phi C$); however, any suitable spindle motor comprising any suitable number of windings in any suitable configuration implementing any suitable number of phases may be employed. FIG. 3 also shows details of spindle driver circuitry comprising three sets of commutation switches 42A–42C each comprising a first field effect transistor (FET) for connecting a respective winding to a power supply Vpwr 44 and a second FET for connecting the respective winding to ground 46. A commutation sequencer 48 generates a control signal 50 applied to the commutation switches 42A–42C in order to drive current from the power supply. 44 through the appropriate windings to ground 46 as determined from the commutation state. The commutation sequencer 48 may control the commutation switches 42A–42C in any suitable manner, such as in a conventional bipolar commutation sequence, tripolar commutation sequence, or hybrid bipolar-tripolar commutation sequence as disclosed in U.S. Pat. No. 5,808,440, the disclosure of which is incorporated herein by reference.

Figure 4:
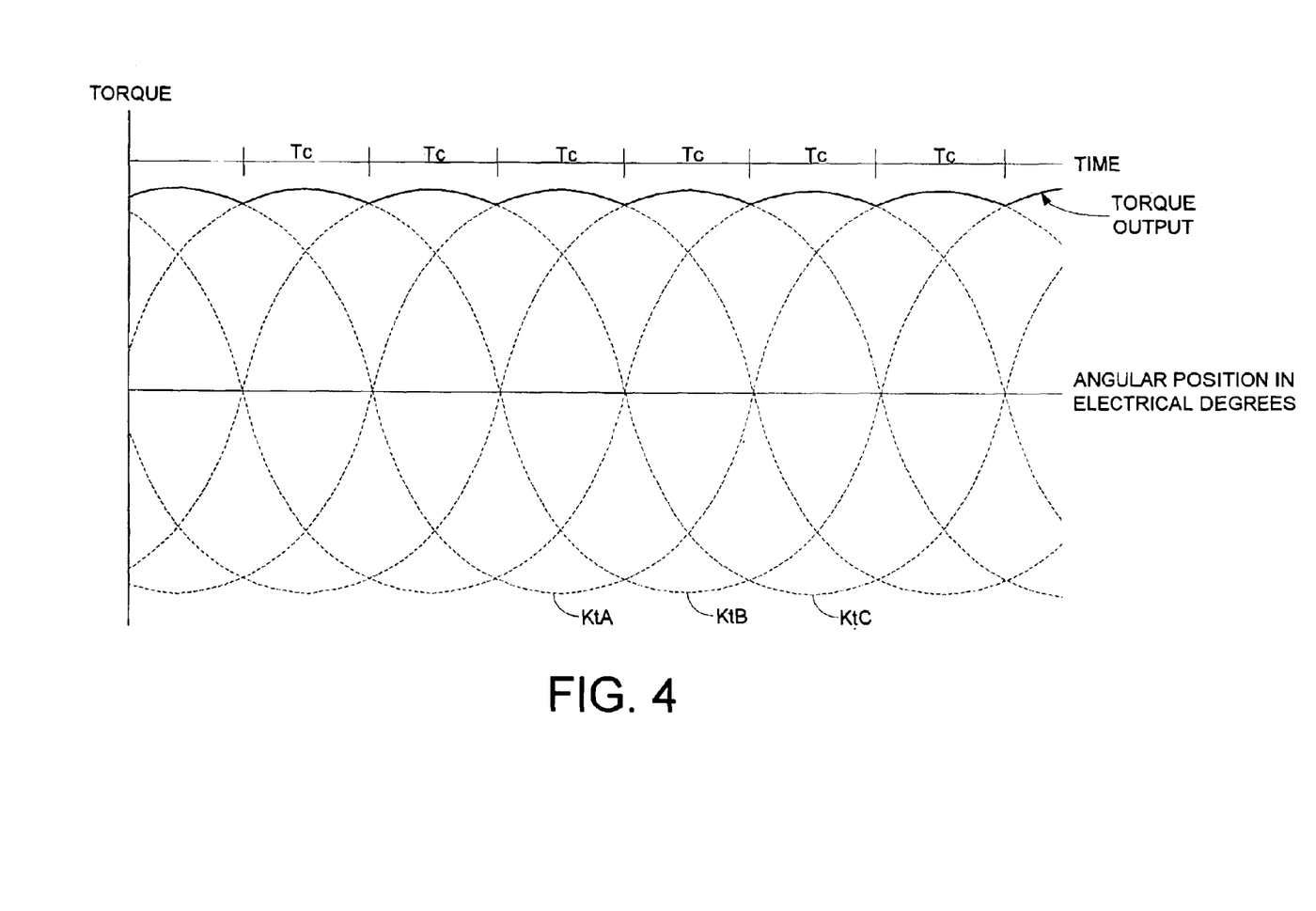
FIG. 4 is a waveform showing the torque curves generated by the windings of a three-phase spindle motor and an associated commutation interval.

The amount of torque generated by the spindle motor 12 is determined by the angular position of the rotor with respect to the stator, the magnitude of the current driving the windings, and a torque constant Kt. The torque constant Kt is a function of the number of turns in the windings as well as the strength of the permanent magnets. FIG. 4 illustrates the torque curves for the three-phase spindle motor 12 of FIG. 3, where the three dashed-line sine waves KtA, KtB, and KtC correspond to the torque profile for each phase of the spindle motor. The desired torque output (shown as a solid line) is generated by changing the commutation state at the appropriate commutation interval Tc.

The appropriate commutation interval can be determined by detecting zero crossings in the BEMF voltage 16 generated by the un-energized winding. In FIG. 3, a commutation clock 52 is generated by a phase-locked-loop (PLL) 54 which locks onto the frequency of the BEMF zero crossings signal 20. The commutation clock 52 is applied to the commutation sequencer 48 and a BEMF speed control block 56. The BEMF speed control block 56 computes the BEMF speed error as the difference between an actual and desired frequency of the BEMF zero crossings signal 20, and implements a compensator for generating a BEMF spindle control current command 58 in response to the BEMF speed error. A current modulator 68 adjusts a duty cycle of a PWM signal 14 (spindle control current 14 in FIG. 1A) in response to the BEMF spindle control current command 58 which controls the amount of current flowing through the energized windings, and therefore the amount of torque output and speed of the spindle motor 12. BEMF detection window circuitry 59 periodically disables the PWM signal 14 (e.g., holds the PWM signal 14 high) for a predetermined interval (detection window) to attenuate noise in the BEMF voltage 16 while the BEMF detector 18 compares the BEMF voltage 16 to the threshold. In the embodiment of FIG. 3, the timing of the BEMF detection window is determined from the commutation clock 52.

A wedge speed control block 60 generates the wedge speed error in response to the servo wedges 8 and the reference time period. The wedge speed control block 60 implements a compensator for generating a wedge spindle control current command 62 in response to the wedge speed error. In one embodiment, the compensator implemented in the wedge speed control block 60 has a higher bandwidth than the compensator implemented by the BEMF speed control block 56.

A multiplexer 64 controlled by signal B/W 65 selects between the BEMF spindle control current command 58 and the wedge spindle control current command 62 as the control current command 66 applied to the current modulator 68. During an error condition 72, the current modulator 68 fixes the duty cycle of the PWM signal 14 in response to an at-speed current command 74 so that the at-speed current is applied to the windings.

In one embodiment, the B/W signal 65 also disables the BEMF detection window circuitry 59 while the speed of the spindle motor 12 is controlled in response to the wedge speed error. This embodiment helps reduce acoustic noise caused by current transients that occur when the PWM signal 14 is disabled (e.g., held high) during the detection window. In one embodiment while the BEMF detection window circuitry 59 disabled, the B/W signal 65 configures the PLL 54 to output a fixed frequency commutation clock 52 corresponding to the at-speed frequency. In an alternative embodiment, the PLL 54 continues to generate the commutation clock 52 in response to the BEMF signal 20 even though it may be less reliable due to the noise induced into the BEMF voltage 16 by the switching action of the PWM signal 14.

In one embodiment, a wedge time counter is incremented at a predetermined frequency. A predetermined number of wedge time counter values are accumulated representing a predetermined number of wedge-to-wedge times to generate the wedge time period. This embodiment is illustrated in the flow diagram of FIGS. 5 and 6. At step 76 the BEMF detector 18 is enabled and the disk 4 is spun up to the operating speed by updating the spindle control current 14 in response to the BEMF speed error 58. Once the disk 4 is rotating at the operating speed (substantially zero BEMF speed error 58), a reference time period is calibrated at step 78. In this embodiment, the reference time period is generated by accumulating a predetermined number of wedge time counter values. That is, as each servo wedge 8 is detected, the wedge time counter value is summed into the reference time period (unless a servo wedge error is encountered as described below, in which case the wedge time counter value is ignored). In one embodiment, the wedge time counter is reset at each servo wedge 8, and in another embodiment, the wedge time counter is free running and the wedge-to-wedge time is determined from the incremented wedge time counter value from wedge to wedge.

Figure 5:
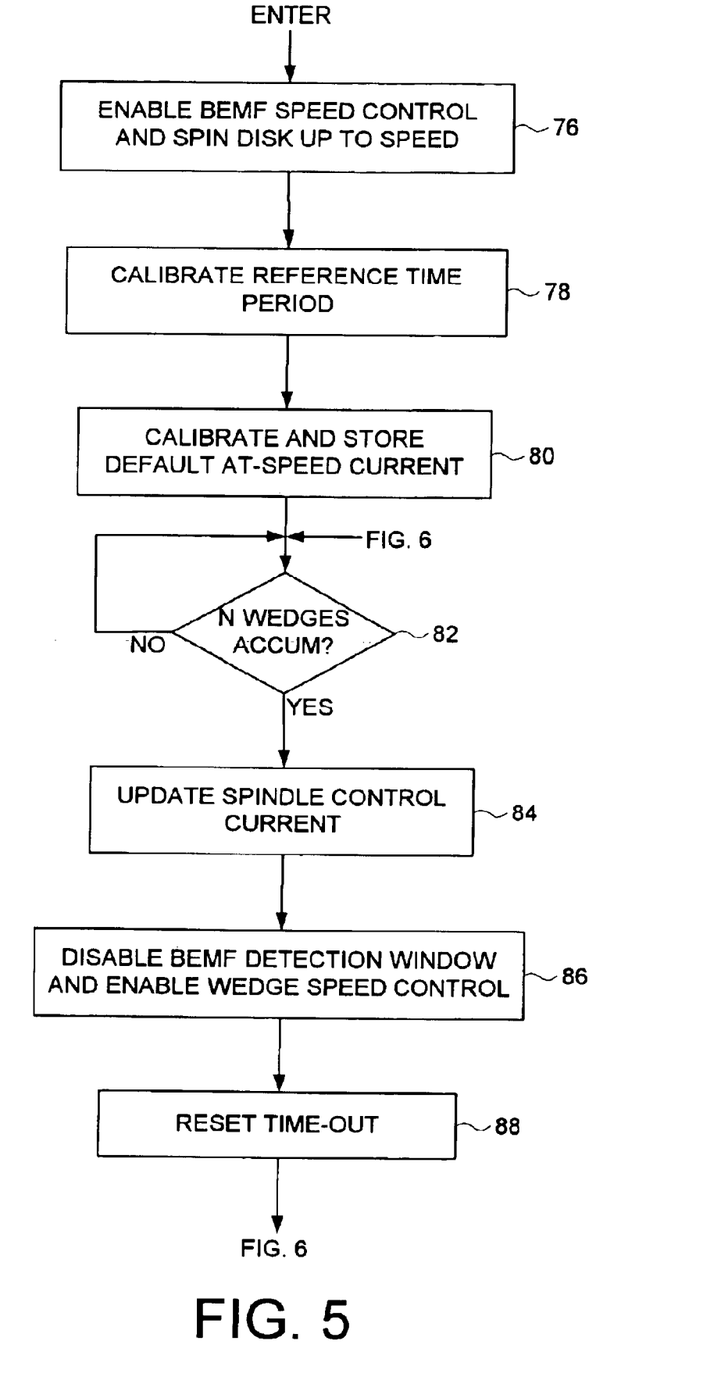
FIG. 5 is a flow diagram according to an embodiment of the present invention for spinning the disk up to the operating speed, calibrating a default at-speed current, and switching from the BEMF spindle speed control mode to wedge spindle speed control mode.

At step 80 a default at-speed current is calibrated which is the spindle control current 14 that generates a substantially zero BEMF speed error. The default at-speed current is used as the spindle control current 14 if an error condition is detected immediately after transitioning into the wedge speed control mode. Otherwise, the at-speed current is updated while the wedge speed error is substantially zero when controlling the spindle motor 12 in the wedge speed control mode.

While in the BEMF spindle speed control mode, the wedge time counter values are accumulated until at step 82 N wedge-to-wedge times have been accumulated into a wedge time period. If so at step 84 the spindle control current 14 is updated in response to the wedge speed error computed by subtracting the wedge time period from the reference time period. At step 86 the BEMF detection window circuitry 59 is disabled, the wedge spindle speed control mode is enabled, and at step 88 a time-out counter for timing a time-out interval is reset. Any suitable time-out interval may be employed. In one embodiment, N wedge time counter values are accumulated to generate the wedge speed error, and the time-out interval is configured to M*N servo wedges 8 (where M is greater than 1 e.g., 1.5). That is, an error condition is detected if N wedge time counter values have not been accumulated within M*N servo wedges 8.

Figure 6:
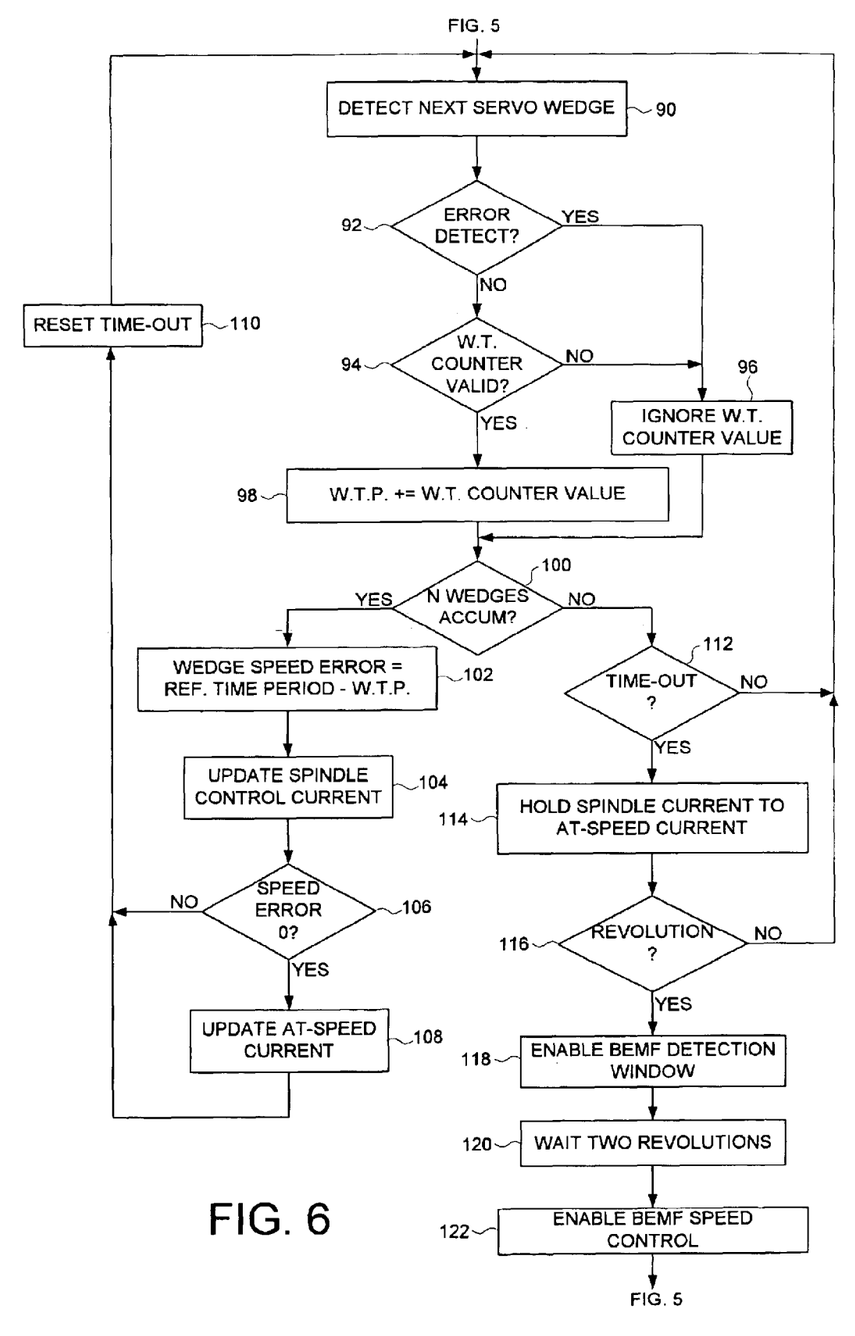
FIG. 6 is a flow diagram according to an embodiment of the present invention wherein a spindle control current is updated in response to a wedge speed error generated by accumulating a predetermined number of wedge-to-wedge times to generate a wedge time period and comparing the wedge time period to a reference time period.

Control then continues at step 90 of FIG. 6 wherein the next servo wedge 8 is detected. If a servo wedge error occurs, which may include an inability to synchronize to a servo wedge due to a burst error or detection of a bad track ID at step 92, or a bad wedge time counter value at step 94, then at step 96 the wedge time counter value is, ignored. A bad wedge time counter value may be detected at step 94, for example, if a servo wedge is missed altogether. If a servo wedge error is not detected, then at step 98 the wedge counter value is summed into a wedge time period (W.T.P.). If at step 100 N wedge time counter values have been accumulated, then at step 102 the wedge speed error is computed by subtracting the wedge time period from the reference time period. At step 104 the spindle control current 14 is updated in response to the wedge speed error. If at step 106 the wedge speed error is zero (or substantially zero), then at step 108 the at-speed current is updated with the spindle control current 14. Some form of averaging may be employed to filter noisy or erroneous spindle control current values. At step 110 the timer for timing the time-out interval is reset, and the process continues at step 90.

If at step 100 N wedge time counter values have not been accumulated and at step 112 the time-out interval expires, then an error condition is detected and at step 114 the spindle control current 14 is set to the at-speed current. Setting the spindle control current 14 to the at-speed current helps maintain the disk at the operating speed until the error condition subsides. If at step 116 a revolution of the disk 4 has not occurred without updating the spindle control current 14, then control branches back to step 90 to detect the next servo wedge. Because the time-out interval has not been reset, control will branch to step 112 and step 114 until N wedge time counter values have been accumulated at step 100. However, if at step 116 an entire revolution of the disk 4 has occurred before N wedge time counter values are accumulated, then the disk controller 22 transitions back into the BEMF spindle speed control mode. At step 118 the BEMF detection window circuitry 59 is enabled, and after waiting two revolutions of the disk 4 at step 120 to allow the BEMF speed error 58 to settle, the BEMF spindle speed control mode is enabled at step 122 and control branches to step 82 of FIG. 5. The disk controller 22 remains in the BEMF spindle speed control mode until again N wedge time counter values are accumulated at step 82 and the spindle control current 14 is updated at step 84.

In one embodiment, the disk controller 22 switches from the wedge spindle speed control mode to the BEMF spindle speed control mode without having detected an error. For example, during a calibration procedure the disk controller 22 may seek the head 10 to a calibration track where the timing between servo wedges 8 changes such that the reference time period is no longer valid. In addition, the disk controller 22 may switch from wedge spindle speed control to BEMF spindle speed control to perform certain test during manufacturing, such as resonance discover of the spindle motor 12. After disabling the wedge spindle speed control mode the disk controller 22 sets the spindle control current 14 to the at-speed current 74 for a predetermined interval (e.g., two revolutions of the disk) to allow the BEMF speed error 58 to settle. Once the BEMF speed error 58 settles, the disk controller 22 can transition safely into the BEMF spindle speed control mode.

We claim:

1. A disk drive comprising:
    (a) a disk comprising a plurality of tracks, wherein each track comprises a plurality of data sectors and a plurality of servo wedges;
    (b) a head actuated over the disk;
    (c) a spindle motor for rotating the disk at an operating speed in response to a spindle control current, the spindle motor comprising a plurality of windings which generate a back electromotive force (BEMF) voltage;
    (d) a BEMF detector for generating a BEMF signal by comparing the BEMF voltage to a threshold; and
    (e) a disk controller for:
        measuring a BEMF speed error responsive to the BEMF signal during a BEMF spindle speed control mode;
        updating the spindle control current in response to the BEMF speed error to drive the disk at the operating speed;
        measuring a wedge-to-wedge time representing a time period between each servo wedge;
        calibrating a reference time period representing an accumulation of a predetermined number of wedge-to-wedge times while the BEMF speed error is substantially zero;
        switching to a wedge spindle speed control mode;
        measuring a wedge time period representing an accumulation of a predetermined number of wedge-to-wedge times;
        generating a wedge speed error representing a difference between the reference time period and the wedge time period; and
        maintaining the disk at the operating speed by updating the spindle control current in response to the wedge speed error.

2. The disk drive as recited in claim 1, wherein the disk controller for:
    (a) calibrating an at-speed current corresponding to a substantially zero wedge speed error; and
    (b) detecting a time-out error condition if the spindle control current is not updated within a time-out interval, and applying the at-speed current to the spindle motor until the spindle control current is updated.

3. The disk drive as recited in claim 1, wherein the disk controller for calibrating a default at-speed current corresponding to a substantially zero BEMF speed error.

4. The disk drive as recited in claim 1, further comprising a wedge time counter incremented at a predetermined frequency, wherein the disk controller for accumulating wedge time counter values representing a predetermined number of wedge-to-wedge times to generate the wedge time period.

5. The disk drive as recited in claim 4, wherein the disk controller does not include the wedge time counter value in the wedge time period if a servo wedge error is detected.

6. The disk drive as recited in claim 5, wherein the servo wedge error includes an inability to synchronize to a servo wedge.

7. The disk drive as recited in claim 5, wherein the servo wedge error includes detecting an invalid track identification value in a servo wedge.

8. The disk drive as recited in claim 5, wherein the servo wedge error includes detecting an invalid wedge time counter value.

9. The disk drive as recited in claim 5, wherein:
    (a) the disk controller for calibrating an at-speed current corresponding to a substantially zero wedge speed error; and
    (b) if the disk controller excludes a predetermined number of wedge time counter values from the wedge time period, a time-out error condition occurs wherein the disk controller for applying the at-speed current to the spindle motor until the spindle control current is updated.

10. The disk drive as recited in claim 9, wherein the time-out error condition subsides after the disk controller successfully accumulates a predetermined number of wedge time counter values and updates the spindle control current.

11. The disk drive as recited in claim 10, wherein if the time-out error condition does not subside within a predetermined failure interval, the disk controller begins controlling the spindle motor in response to the BEMF speed error generated from the BEMF signal.

12. The disk drive as recited in claim 11, wherein the predetermined failure interval equals one revolution of the disk.

13. The disk drive as recited in claim 11, wherein if the disk controller successfully accumulates a predetermined number of wedge time counter values and updates the spindle control current, the disk controller begins controlling the spindle motor in response to the wedge speed error.

14. The disk drive as recited in claim 1, further comprising:
    (a) a current modulator for generating a PWM signal representing the spindle control current; and (b) BEMF detection window circuitry for periodically disabling the PWM signal for a predetermined interval to attenuate noise in the BEMF voltage while the BEMF detector compares the BEMF voltage to the threshold, wherein the disk controller for disabling the BEMF detection window circuitry while updating the spindle control current in response to the wedge speed error.

15. The disk drive as recited in claim 1, wherein the disk controller for:
   (a) switching from the wedge spindle speed control mode to the BEMF spindle speed control mode; and
   (b) during a settle interval between modes, applying an at-speed current to the spindle motor.

16. A method of operating a disk drive, the disk drive comprising a disk having a plurality of tracks, wherein each track comprises a plurality of data sectors and a plurality of servo wedges, a head actuated over the disk, a spindle motor for rotating the disk at an operating speed in response to a spindle control current, the spindle motor comprising a plurality of windings which generate a back electromotive force (BEMF) voltage, and a BEMF detector for generating a BEMF signal by comparing the BEMF voltage to a threshold, the method comprising the steps of:
   (a) measuring a BEMF speed error responsive to the BEMF signal during a BEMF spindle speed control mode;
   (b) updating the spindle control current in response to the BEMF speed error to drive the disk at the operating speed;
   (c) measuring a wedge-to-wedge time representing a time period between each servo wedge;
   (d) calibrating a reference time period representing an accumulation of a predetermined number of wedge-to-wedge times while the BEMF speed error is substantially zero;
   (e) switching to a wedge spindle speed control mode;
   (f) measuring a wedge time period representing an accumulation of a predetermined number of wedge-to-wedge times;
   (g) generating a wedge speed error representing a difference between the reference time period and the wedge time period; and
   (h) maintaining the disk at the operating speed by updating the spindle control current in response to the wedge speed error.

17. The method as recited in claim 16, wherein further comprising the steps of:
   (a) calibrating an at-speed current corresponding to a substantially zero wedge speed error; and
   (b) detecting a time-out error condition if the spindle control current is not updated within a time-out interval, and applying the at-speed current to the spindle motor until the spindle control current is updated.

18. The method as recited in claim 16, further comprising the step of calibrating a default at-speed current corresponding to a substantially zero BEMF speed error.

19. The method as recited in claim 16, further comprising the steps of:
   (a) incrementing a wedge time counter at a predetermined frequency; and
   (b) accumulating wedge time counter values representing a predetermined number of wedge-to-wedge times to generate the wedge time period.

20. The method as recited in claim 19, further comprising the step of excluding the wedge time counter value from the wedge time period if a servo wedge error is detected.

21. The method as recited in claim 20, wherein the servo wedge error includes an inability to synchronize to a servo wedge.

22. The method as recited in claim 20, wherein the servo wedge error includes detecting an invalid track identification value in a servo wedge.

23. The method as recited in claim 20, wherein the servo wedge error includes detecting an invalid wedge time counter value.

24. The method as recited in claim 20, further comprising the steps of:
   (a) calibrating an at-speed current corresponding to a substantially zero wedge speed error; and
   (b) if a predetermined number of wedge time counter values are excluded from the wedge time period, a time-out error condition occurs wherein the at-speed current is applied to the spindle motor until the spindle control current is updated.

25. The method as recited in claim 24, wherein the time-out error condition subsides after successfully accumulating a predetermined number of wedge time counter values and updating the spindle control current.

26. The method as recited in claim 25, wherein if the time-out error condition does not subside within a predetermined failure interval, further comprising the step of controlling the spindle motor in response to the BEMF speed error generated from the BEMF signal.

27. The method as recited in claim 26, wherein the predetermined failure interval equals one revolution of the disk.

28. The method as recited in claim 26, wherein if a predetermined number of wedge time counter values are successfully accumulated and the spindle control current updated, the further comprising the step of controlling the spindle motor in response to the wedge speed error.

29. The method as recited in claim 16, further comprising the steps of:
   (a) generating a PWM signal representing the spindle control current;
   (b) periodically disabling the PWM signal during a BEMF detection window to attenuate noise in the BEMF voltage while the BEMF detector compares the BEMF voltage to the threshold; and
   (c) disabling the BEMF detection window while updating the spindle control current in response to the wedge speed error.

30. The method as recited in claim 16, further comprising the steps of:
   (a) switching from the wedge spindle speed control mode to the BEMF spindle speed control mode; and
   (b) during a settle interval between modes, applying an at-speed current to the spindle motor.

* * * * *